: US 11,473,618 B2

United States Patent
Linton et al.

(10) Patent No.: US 11,473,618 B2
(45) Date of Patent: Oct. 18, 2022

(54) THRUST BUSHING SURFACE LAYER USING DIRECTLY BONDED HEAT ACTIVATED NITRILE-PHENOLIC ADHESIVE FILM

(71) Applicant: Schaeffler Technologies AG & Co. KG, Herzogenaurach (DE)

(72) Inventors: Daniel Linton, North Canton, OH (US); John Volcansek, Medina, OH (US); Joseph Bonvissuto, Wooster, OH (US); Jung-Feng Hu, Wooster, OH (US); Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 311 days.

(21) Appl. No.: 16/749,302

(22) Filed: Jan. 22, 2020

(65) Prior Publication Data
US 2020/0158163 A1 May 21, 2020

Related U.S. Application Data

(62) Division of application No. 15/894,463, filed on Feb. 12, 2018, now Pat. No. 10,584,740.

(51) Int. Cl.
*B32B 37/06* (2006.01)
*F16C 17/04* (2006.01)
*B32B 15/098* (2006.01)
*B32B 37/10* (2006.01)
(Continued)

(52) U.S. Cl.
CPC .......... *F16C 17/045* (2013.01); *B32B 15/098* (2013.01); *B32B 37/06* (2013.01); *B32B 37/10* (2013.01); *F16C 17/04* (2013.01); *F16C 33/1065* (2013.01); *F16C 33/125* (2013.01); *F16C 33/201* (2013.01);
(Continued)

(58) Field of Classification Search
CPC .... F16C 17/045; F16C 17/04; F16C 33/1065; F16C 33/125; F16C 33/201; F16C 33/205; F16C 2208/90; F16C 2223/30; F16C 2361/43; B32B 15/098; B32B 37/06; B32B 37/10; B32B 2307/746; B32B 1/08; B32B 3/30; B32B 2264/105; B32B 2307/558; B32B 5/16; B32B 7/12; B32B 9/005; B32B 9/045; B32B 15/18; B32B 27/08; B32B 27/14; B32B 2307/538; B32B 15/20;
(Continued)

(56) References Cited

U.S. PATENT DOCUMENTS 5,396,972 A    3/1995  Grele
6,146,727 A *  11/2000 Dannels ................ B29C 43/183
                                          188/264 G
(Continued)

FOREIGN PATENT DOCUMENTS

JP   1095055    4/1998
WO   9835807    7/1998

OTHER PUBLICATIONS

InnovationQ Plus Search History (Year: 2022).*

*Primary Examiner* — Cynthia L Schaller
(74) *Attorney, Agent, or Firm* — Volpe Koenig

(57) ABSTRACT

A method for manufacturing a thrust washer is provided in which a phenolic resin layer is bonded directly to a bearing surface of the base material using two presses at an elevated temperature and pressure.

10 Claims, 2 Drawing Sheets

(51) Int. Cl.
*F16C 33/20* (2006.01)
*F16C 33/10* (2006.01)
*F16C 33/12* (2006.01)

(52) U.S. Cl.
CPC ...... *F16C 33/205* (2013.01); *B32B 2307/746* (2013.01); *F16C 2208/90* (2013.01); *F16C 2223/30* (2013.01); *F16C 2361/43* (2013.01)

(58) Field of Classification Search
CPC ..... B32B 27/42; B32B 2597/00; B32B 27/10; F16H 41/24
See application file for complete search history.

(56) References Cited

U.S. PATENT DOCUMENTS

| | | | |
|---|---|---|---|
| 6,524,681 | B1 | 2/2003 | Seitz et al. |
| 6,905,246 | B2 | 6/2005 | Iwata et al. |
| 7,147,378 | B2 * | 12/2006 | Chu ...................... B32B 15/046 384/300 |
| 8,281,912 | B2 | 10/2012 | Jameson |
| 9,593,713 | B2 | 3/2017 | Farahati et al. |
| 2003/0185475 | A1 | 10/2003 | Iwata et al. |
| 2006/0034556 | A1 | 2/2006 | Thompson et al. |
| 2007/0160314 | A1 | 7/2007 | Richie et al. |
| 2008/0298732 | A1 * | 12/2008 | Gradu ...................... F16C 33/60 384/452 |
| 2008/0308365 | A1 | 12/2008 | Foge et al. |
| 2012/0237754 | A1 * | 9/2012 | Kasuga ................ B29C 70/546 428/304.4 |
| 2012/0294557 | A1 | 11/2012 | Soelch et al. |
| 2013/0029117 | A1 | 1/2013 | Read et al. |
| 2013/0334006 | A1 | 12/2013 | Stern et al. |
| 2014/0321782 | A1 | 10/2014 | Farahati et al. |
| 2016/0265597 | A1 | 9/2016 | Smith et al. |
| 2017/0211582 | A1 | 7/2017 | Patel et al. |

* cited by examiner

THRUST BUSHING SURFACE LAYER USING DIRECTLY BONDED HEAT ACTIVATED NITRILE-PHENOLIC ADHESIVE FILM

INCORPORATION BY REFERENCE

The following documents are incorporated herein by reference as if fully set forth: U.S. patent application Ser. No. 15/894,463, filed Feb. 12, 2018.

FIELD OF INVENTION

The present invention relates to a thrust bushing arrangement, and more particularly to phenolic resin layer for a thrust bushing with simplified construction and improved performance for a torque converter.

BACKGROUND

Roller thrust bearings are known and used in a variety of applications for supporting axial loads. Such applications may include a torque converter, a transmission plate, an automatic transmission clutch carrier, a planet gear carrier, a ring gear carrier, and other automatic transmission components that require at least one thrust bearing.

Typical thrust bushings or washers are separate components assembled between rotating components and formed from a variety of materials from steel to resin-soaked paper. For a resin-soaked paper (or other fiber matrix substrate), the paper accommodates irregularities in the mating surfaces in rotating components, but can be susceptible to wear. Thrust bushings must provide a very low coefficient of friction while having very high durability. In applications with an oil bath with pressure and velocity (PV), typical thrust bushing materials such as resin-soaked paper experience problems due to heat and wear. Ideally, a thrust bushing in a torque converter should last the entire useful life of a vehicle. In torque converter applications, the thrust bushing must be able to with stand PV values up to 5.5 $(N/mm^2)*(m/sec)$. Manufacturing costs are also a concern for producing thrust bushings.

SUMMARY

Briefly stated, a rotating component assembly is provided for a high-pressure high-velocity oil bath application. The rotating component assembly includes a first rotating component, a second rotating component, and at least one phenolic resin layer. The first rotating component has a base material with a bearing surface. The second rotating component has a mating surface directed toward the bearing surface. The at least one phenolic resin layer is bonded directly to the bearing surface. The at least one phenolic resin layer is the only structure between the rotating components. The at least one phenolic resin layer is configured to prevent wear between the two rotating components.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Figure 1:
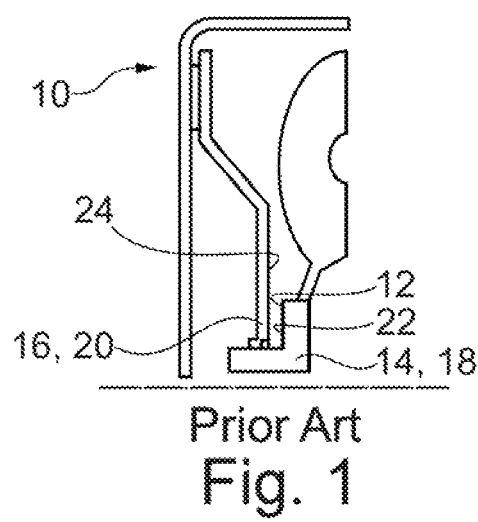
FIG. 1 is a partial schematic view of a prior art torque converter.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described. "About" as used herein when referring to a measurable value such as an amount, a temporal duration, and the like, is meant to encompass variations of ±5% from the specified value.

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The present disclosure relates to a phenolic resin bushing layer of a thrust bushing for, e.g., a torque converter. The thrust bushing is applied (e.g., by bonding or curing) onto a bearing surface of a rotating component. The rotating component, thrust bushing layer, and a second rotating component collectively form a rotating component assembly.

Referring to FIG. 1, a portion of a prior art torque converter 10 is shown. The torque converter 10 includes a thrust washer 12 positioned axially between a first rotating component 14 and a second rotating component 16, with at least one of the rotating components 14, 16 providing an axial thrust. The rotating components 14, 16 may be for example, a turbine hub 18 and a piston 20. Fluid, such as oil, flows along outer surfaces of the thrust washer 12 to prevent wear or heat between the rotating components 14, 16. The rotating components 14, 16 respectively have bearing surfaces 22, 24 (also referred to as mating surface 24) that face each other as well as the thrust washer 12.

Figure 2:
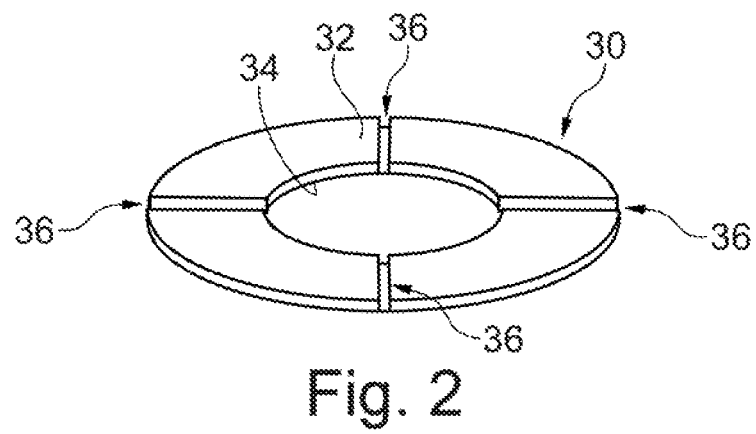
FIG. 2 is a perspective view of a phenolic resin bushing layer in accordance with an embodiment of the present application.

FIG. 2 shows a phenolic resin layer 30, also referred to as a phenolic resin, which may be a phenolic resin film. The phenolic resin layer has a top surface 32 and a bottom surface 34. The phenolic resin layer 30 functions in the same manner as the thrust washer 12 of the prior art, but without any base material independent from the rotating components 14, 16 for receiving the phenolic resin layer 30. In other words, the present application provides a thrust bearing or thrust washer that consists only of one or more phenolic resin layers. Particularly, the phenolic resin layer 30 of the present application is not impregnated into a fabric matrix or other bushing structure.

A plurality of grooves 36 may optionally be provided in the phenolic resin layer 30. The grooves 36 may be substantially radially arranged as illustrated, although other shapes are contemplated so long as the grooves promote oil flow between the rotating components 14, 16. The grooves 36 are illustrated as formed in the top surface 32, although some or all of the grooves 36 may be formed in the lower surface 34. When the phenolic resin 30 is provided in applications with an oil bath, the grooves 36 are generally not required.

Figure 3:
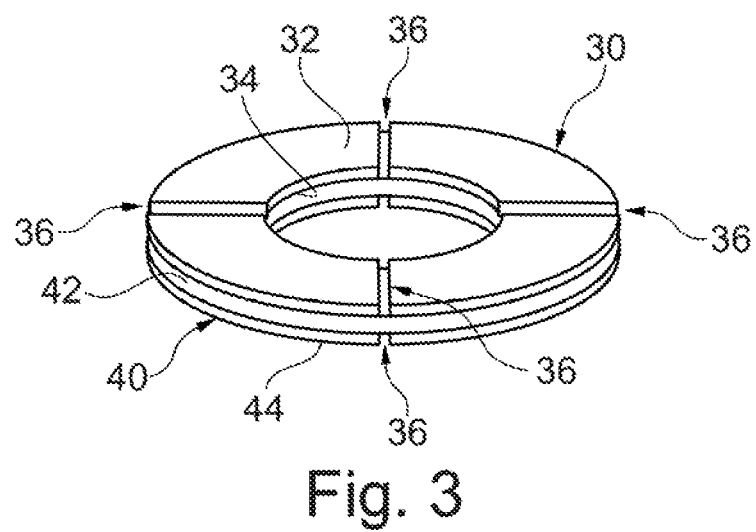
FIG. 3 is a perspective view of a phenolic resin bushing layer in accordance with another embodiment of the present application.

FIG. 3 shows two phenolic resin layers 30, 40. A plurality of such phenolic resin layers may be provided, including three or more phenolic resins. The phenolic resin layers 30, 40 may include a plurality of grooves 36, particularly at a top surface of the topmost phenolic resin layer and the bottom surface of the bottommost phenolic resin layer (e.g., surface 44 of layer 40 in the FIG. 3 embodiment).

Figure 4:
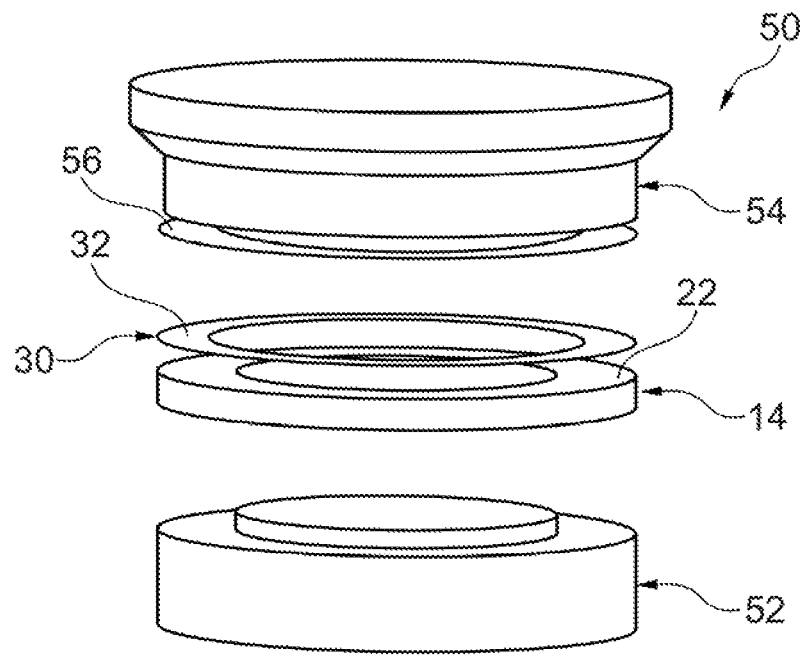
FIG. 4 is a perspective view of a method of forming the phenolic resin bushing layer of FIG. 2 on a surface of a component.

FIG. 4 shows a perspective view of a method for forming the phenolic resin layer 30 upon a bearing surface 22 or 24 of one of the rotating components 14 or 16. As an illustrative example, a phenolic resin film is positioned on a bearing surface 22 of the rotating component 14. The bearing surface 24 of the other rotating component 16 may be considered a mating surface 24 for purposes of clarity. The bearing surface 22 is one surface of a base material 23 that constitutes part of the rotating component 14. The bearing surface 22 and the phenolic resin film 30 are placed between two press sections of a hot press 50 having a lower press plate 52 and an upper press plate 54. A non-stick coating 56 is provided between the phenolic resin 30 and the upper press plate 54 for later removal of the bonded bearing surface 22 and phenolic resin layer 30.

In the process discussed above, the phenolic resin is bonded directly to the bearing surface 22 under heat and pressure. The bearing surface 22 is in an annular disk shape typical of thrust bearings, and is smooth, flat, and clean. The bottom press 52 and top press 54 are pressed together under predetermined conditions. Generally, the predetermined conditions for this manufacturing process include a predetermined temperature of 425±25° F., a predetermined amount of time of 2±1 minute, and a predetermined pressure of 15 to 55 psi. Afterward, the top press 54 is then released (via the non-stick coating 56) and the phenolic resin 30 has been cured to the bearing surface 22. Once cooled, the bonded/cured bearing component 14 is ready for use.

Figure 5:
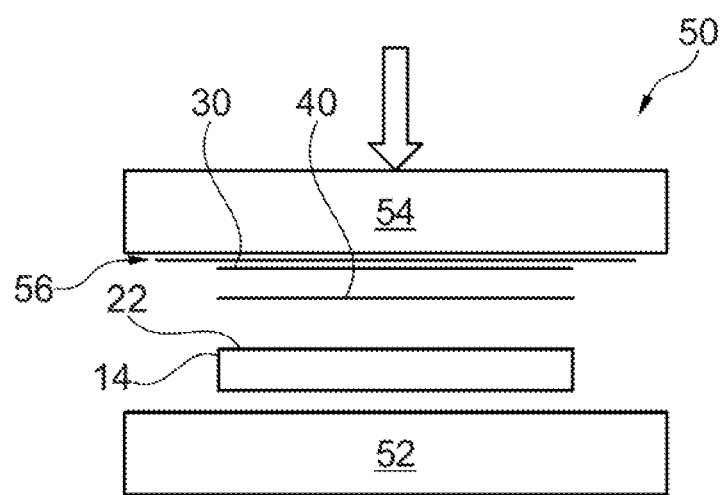
FIG. 5 schematically shows a method of forming the phenolic resin bushing layer of FIG. 3 on a surface of a component.

FIG. 5 schematically shows, similar to FIG. 4, a method for forming a plurality of phenolic resin layers 30, 40 upon a bearing surface 22 of one of the rotating components 14, 16. The process is substantially the same as described above for FIG. 4, except for an increase in the resulting thickness of the cured phenolic resin film.

In general, regardless of the machine or vehicle application, the embodiments disclosed above may be considered a rotating component assembly 26 that includes the first and second rotating components 14, 16 along with the one or more phenolic resin layers 30, 40.

Testing of one exemplary embodiment of the application has shown that in a ULV oil bath of 120° C., the cured phenolic resin film has a dynamic coefficient of friction of between 0.04 and 0.07 and a static coefficient of friction of 0.12 to 0.17. Testing occurred under PV values of consistently 6.3 $(N/mm^2)*(m/sec)$ (i.e., extreme/max contemplated conditions for torque converter applications) for a duration of 20 hours with no relief cycle time. The resin-bonded bearing surface 22 or 24 was non-porous and both bearing surfaces 22, 24 had a surface roughness less than Ra 1.0. The tested parts showed no increase in oil temperature and less than 0.02 mm of wear.

The phenolic resin 30 of the present application may be, for example, a heat-activated nitrile-phenolic adhesive. Details of exemplary phenolic resin 30 are discussed in U.S. Patent Application Publication No. 2016/0265597, the disclosure of which is incorporated herein in its entirety for all purposes. The phenolic resin 30 may be bonded to any base material 23 that can withstand the manufacturing process described above, i.e., pressures up to 75 psi at 450° F. for up to 5 minutes. Exemplary materials for base material 23 include steel, stainless steel, bronze, brass, copper, powder metal, porcelain, compressed paper, and hard polymers, as well as alloys or composites thereof.

For use in a vehicle torque converter, a thrust bushing must be able to withstand PV values up to 5.5 $(N/mm^2)*(m/sec)$. The coating of the present application has withstood testing at extreme conditions including PV values as high as 6.3 $(N/mm^2)*(m/sec)$ for three hours with no relief cycles.

The reduced material cost (particularly due to the lack of a substrate for the phenolic resin 30) for the disclosed surface layer has resulted in a reduction of about ⅔ manufacturing costs compared to previous thrust bearings.

One skilled in the art should appreciate that the disclosed bearing surface layer may be useful in various other applications, such as clutch release pads built into wet clutch discs. The present disclosure is applicable for minimizing wear and heat while maintaining durability, and allows for very tight manufacturing tolerances.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. In particular, the clutch carrier of the illustrated embodiments may be substituted with any transmission plate. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Torque Converter
12. Thrust Washer
14. First Rotating Component
16. Second Rotating Component 18. Turbine Hub
20. Piston
22. Bearing Surface
23. Base Material
24. Bearing/Mating Surface
26. Rotating Component Assembly
30. Phenolic Resin Layer
32. Top Surface
34. Bottom Surface
36. Grooves
40. Phenolic Resin Layer
42. Top Surface
44. Bottom Surface
50. Hot Press
52. Lower Press Plate
54. Upper Press Plate
56. Non-stick Coating

What is claimed is:

1. A method for manufacturing a thrust washer on a rotating component, comprising:
   providing a first press having a non-stick coating;
   providing a second press;
   providing a base material between the first press and the second press, the base material having a mating surface adapted to form a bearing surface oriented toward the first press;
   providing at least one phenolic resin layer on the mating surface;
   heating the first press and the second press to a temperature of about 400° F. to about 450° F.;
   applying a pressure of about 15 psi to about 55 psi from the first press and the second press to the at least one phenolic resin layer and the base material; and
   releasing the pressure from the first press or the second press after about 2 minutes of applying the pressure such that the at least one phenolic resin layer is bonded directly to the mating surface.

2. The method of claim 1, wherein the at least one phenolic resin layer is a nitrile-phenolic adhesive.

3. The method of claim 1, wherein the base material of the thrust washer formed according to the method is configured to withstand pressure up to about 75 psi at about 450° F. for up to about 5 minutes.

4. The method of claim 3, wherein the at least one phenolic resin layer has a dynamic coefficient of friction of about 0.04 to about 0.07 and a static coefficient of friction of about 0.12 to about 0.17.

5. The method of claim 3, wherein the mating surface has a surface roughness less than Ra 1.0 micrometers.

6. A method for manufacturing a thrust washer, consisting essentially of:
   providing a first press having a non-stick coating;
   providing a second press;
   providing a base material between the first press and the second press, the base material having a surface oriented toward the first press;
   providing at least one phenolic resin layer on the surface, wherein the at least one phenolic resin layer is the only structure between the base material and the non-stick coating of the first press;
   heating the first press and the second press;
   bonding the at least one phenolic resin layer to the base material by pressing the first press and the second press against the at least one phenolic resin layer and the base material for a predetermined amount of time; and
   releasing the first press or the second press.

7. The method of manufacturing of claim 6, wherein the predetermined amount of time is about 2 minutes.

8. The method of claim 6, wherein the base material of the thrust washer formed according to the method is configured to withstand pressure up to about 75 psi at about 450° F. for up to about 5 minutes.

9. The method of claim 6, wherein the phenolic resin layer of the thrust washer formed according to the method has a dynamic coefficient of friction of about 0.04 to about 0.07 and a static coefficient of friction of about 0.12 to about 0.17.

10. The method of claim 6, wherein a mating surface of the thrust washer formed according to the method of claim 6 has a surface roughness less than Ra 1.0 micrometers.

* * * * *